United States Patent Office 3,204,181
Patented Aug. 31, 1965

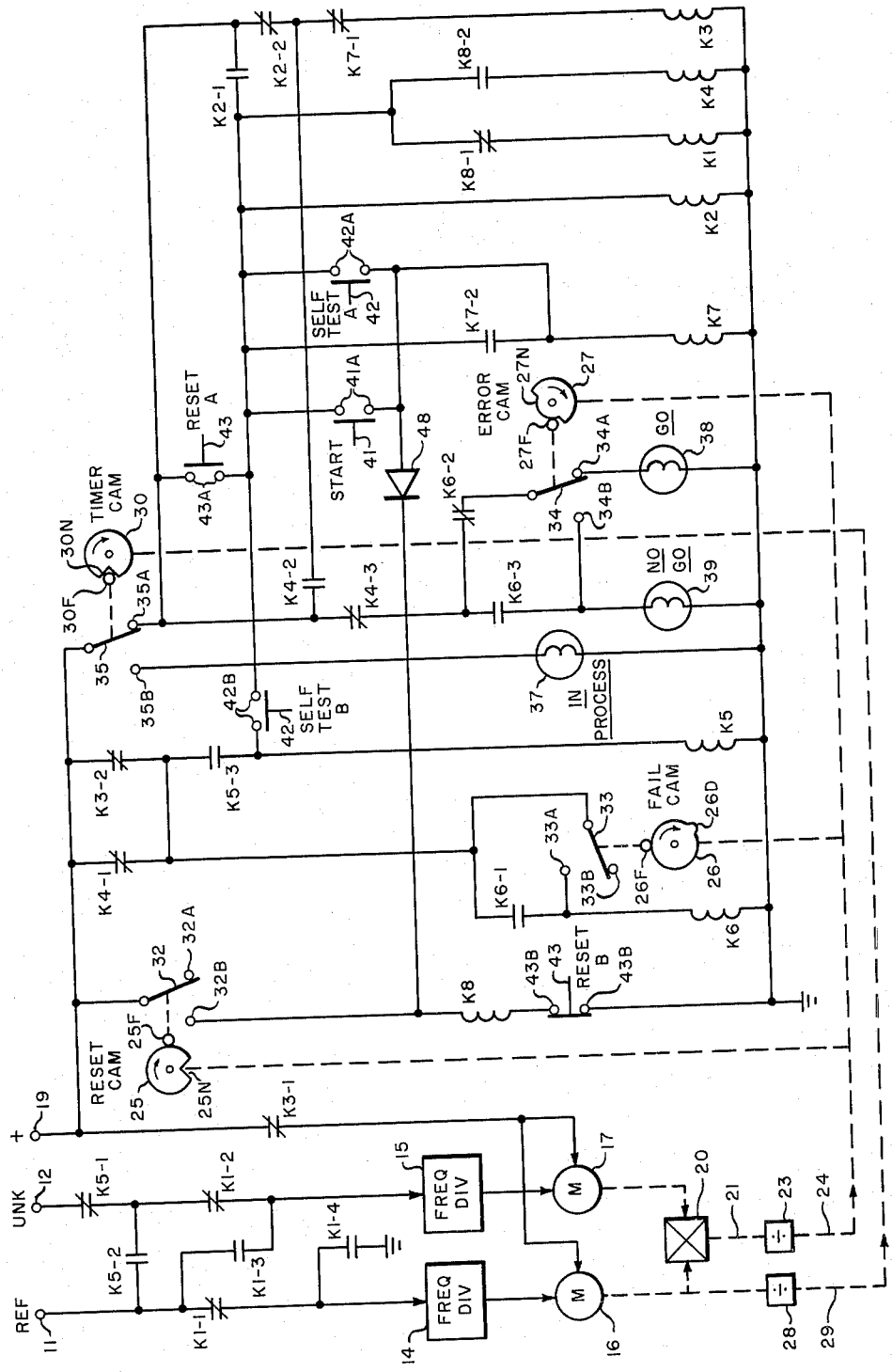

3,204,181
ELECTRO-MECHANICAL FREQUENCY COMPARATOR UTILIZING CAMS FOR TIMING
Jameson A. Cooper, Pleasantville, and Richard Saylor, Monsey, N.Y., assignors to General Precision, Inc., a corporation of Delaware
Filed Jan. 23, 1963, Ser. No. 253,396
6 Claims. (Cl. 324—79)

This invention relates to frequency comparators and more particularly to a comparator for simultaneously comparing a voltage of unknown frequency with a reference voltage of known frequency and for indicating if the unknown frequency stays within a predetermined percentage, plus or minus, of the reference frequency over a substantial preset length of time.

Many devices have been employed for performing this type of frequency comparison. However, they all employ the technique of frequency division until the periods of the two frequencies equal the time over which the comparison is to take place. Since the time is substantial, approximately three or more minutes, these devices are complicated as well as bulky.

The comparator herein disclosed utilizes frequency division, but does not divide the frequency to the extent set forth above and in fact stops far short of that point. The divided frequencies, of approximately ten to fifteen cycles per second, are applied to identical frequency responsive motors which have their outputs connected to the inputs of a differential which supplies a shaft rotation equal to their average frequency difference over the measurement period. A plurality of cams operated by the output shaft of the differential perform switching functions which when combined with a logic switching circuit provide indications of a successful comparison or an unsuccessful comparison.

One object of this invention is to provide a novel frequency comparator for simultaneously comparing a voltage of unknown frequency with a voltage of known frequency over a substantial preset length of time and for indicating when the two frequencies deviate, over the time of the measurement, from each other by more than a predetermined amount.

Another object of the invention is to provide a frequency comparator as set forth above which is accurate, reliable and inexpensive to manufacture.

A further object of the invention is to provide a frequency comparator of the class described which occupies a small volume of space.

The foregoing and other objects and advantages of the invention will become more apparent from a consideration of the specificaton and drawing wherein one embodiment of the invention is described and shown in detail for illustration purposes only.

The single figure is a block and schematic diagram of a novel frequency comparator constructed according to the invention.

A reference voltage of known frequency, from a source not shown, is applied to an input terminal 11 while a voltage of unknown frequency, from a source not shown, is applied to another input terminal 12. Terminal 11 is connected to a first frequency dividing circuit 14 by a normally closed set of contacts K1–1 operated by a relay K1, the connection of which, will be described in detail later.

Throughout the drawing contacts disassociated from their operating relay windings are shown by spaced parallel lines. If the contacts are normally closed, that is they are closed when their relay winding is de-energized, a connecting line at an angle is utilized to indicate that they are closed. If, on the other hand the contacts are normally open, that is they are open when their relay winding is de-energized and closed only when the winding is energized, no connecting line is used. In addition, contacts operated by the K1 relay will all be numbered K1 plus an additional numeral to distinguish one contact from the other. With this system it is possible to readily identify that relay winding which operates any given contact.

Input terminal 12 is connected to a second frequency dividing circuit 15 by series-connected normally closed contacts K5–1 and K1–2. Normally open contacts K5–2 connect terminal 11 to the common junction of contacts K5–1 and K1–2 while normally open contacts K1–3 connected the terminal directly to the input of frequency dividing circuit 15. The input of frequency dividing circuit 14 is connected to ground by normally open contacts K1–4.

With the circuit switching arrangement described above terminals 11 and 12 are connected to dividers 14 and 15, respectively, when windings K1 and K5 are de-energized. This condition pervails during a comparison. After a comparison is completed a reset mode is entered into, which requires the energization of windings K1 and K5, and in this mode the reference voltage only is applied to frequency divider 15. How reset is accomplished will be described in detail later. When winding K5 is energized and winding K1 de-energized, the reference voltage is applied to frequency dividers 14 and 15 and terminal 12 is disconnected by contacts K5–1 which open. This mode is the self-test mode where the known frequency is apppled to both dividers. Here again a detailed description will be deferred till later.

Frequency dividers 14 and 15 are identical and each may include a plurality of binary countdown circuits which divide the input frequency until it reaches a predetermined frequency. In one embodiment which was constructed and successfully operated the input frequency was reduced in the dividers to 12½ cycles per second. The reduced frequency from dividers 14 and 15 is applied to stepping motors 16 and 17, respectively, which provide 25 steps per second when their input frequencies are 12½ cycles per second. The motors selected for the above embodiment provide 15-degree steps which resulted in 24 steps per revolution of the output shaft of the motor. The particular frequencies selected are not critical and may be varied to suit different applications of the comparator. However, if changes are made they will affect all the other components and compensating changes will be necessary to retain the appropriate scale factors. Motors 16 and 17 are connected to a direct current power supply 19 by normally closed contacts K3–1 operated by relay winding K3. Power supply 19 provides the power necessary to operate the motors in response to the inputs from dividers 14 and 15.

The output shafts of motors 16 and 17 are connected to the opposite sides of a mechanical differential 20 which has an output shaft 21. Output shaft 21 provides a rotation equal to the difference of the rotations of the input shafts connected to motors 16 and 17 and is connected by a gear reducing unit 23 to a cam shaft 24 which drives a reset cam 25, a fail cam 26, and an error cam 27. The output shaft of motor 16, in addition to being connected to differential 20, is connected by a second gear reducing unit 28 to a second cam shaft 29 which drives a timer cam 30.

Timer cam 30 can only make one revolution for a complete test cycle; therefore, if the test is to take 3 minutes and the output of frequency divider 14 is 12½ c.p.s., gear reducing unit 28 must have a ratio of 187.5:1. However, it is not essential that the test be limited to exactly 3 minutes, nor is it necessary that the exact output frequency of divider 14 be maintained at precisely 12½ c.p.s.; therefore, any convenient, substantially similar ratio may be selected for gear reducing unit 28 since all that can vary in this instance is the length of time over which the comparison is made and as was previously pointed out this is not critical.

It was arbitrarily decided that a 4% error between the reference and the unknown frequency would result in one complete rotation of shaft 24 and the three cams associated therewith. Therefore a 7.5:1 ratio was used in gear reduction unit 23. This ratio must be held close if the scale factor selected is to be maintained since any variation would result in a change in scale factor and the accuracy of the device would not hold. The 12½ c.p.s. frequency of divider 14 will not, if allowed to vary, affect the scale factor since, regardless of the frequency, one revolution of the timer always includes the same number of steps of reference motor 16, which in the case of a 3-minute test cycle with the ratio set forth above for unit 28, equals 4,500 steps.

Error cam 27 has a notch 27N which extends for 126° with the scale factor employed; reset cam 25 has a very narrow notch 25N, which is, in the reset position, which will be defined later, physically aligned with the center of notch 27N of cam 27; and fail cam 26 has a detent 26D, 180° from notch 25N. With this arrangement any error exceeding .7% in one direction would cause the cam follower 27F associated with cam 27 to come out of notch 27N thus indicating an error in excess of .7%. It is possible, however, that the error might exceed 3.3%, in which case follower 27F would be back in notch 27N which would indicate a valid comparison. Therefore, fail cam 26 and detent 26D are provided to supply a permanent indication whenever the detent 26D actuates the follower 26F associated with fail cam 26 by a latching circuit which will be described later. When reset cam 25 occupies the reset position, a follower 25F associated with the cam resets in notch 25N to indicate that all the cams are in the reset position.

The overall accuracy of the comparator is excellent since the errors introduced by the components are small. A basic error of plus or minus one count may always be preset and equals 0.022%. The only other significant errors are introduced by the cams and are directly related to cam alignment and to the tolerance on the width of notch 25N of reset cam 25. In one device constructed the total cumulative error, including the 0.022% error above, was 0.056% which is as good or better than the accuracy attainable with prior comparators.

Each of the cams operates an armature which makes and breaks one of two circuits depending on the position of its associated cam. Cam follower 25F is connected to an armature 32 which engages a contact 32A when the follower is out of notch 25N and a contact 32B when the follower 25F is in notch 25N. Cam follower 26F is connected to an armature 33 which engages a contact 33A when the follower is displaced by detent 26D and a contact 33B at all other times. Cam follower 27F is connected to armature 34 which engages a contact 34A when the follower is in notch 27N and a contact 34B at all other times. A cam follower 30F associated with timer cam 30 is illustrated within a notch 30N on cam 30. The follower is connected to an armature 35 which engages a contact 35A as long as follower 30F is within notch 30N and a contact 35B at all other times.

The comparator utilizes three lamps for indicating the IN PROCESS condition and a successful or unsuccessful comparison. The IN PROCESS lamp 37 is connected between ground and contact 35B. The GO lamp 38 which indicates a successful comparison is connected between ground and contact 34A while the NO GO lamp 39 which indicates an unsuccessful comparison is connected between ground and contact 34B. Lamp 39 is also provided with an alternate connection which will be described later.

Operation of the comparator is controlled by three momentary contact push-button switches 41, 42 and 43 labeled START, SELF-TEST and RESET, respectively. SELF-TEST switch 42 is a dual-contact switch and has two normally open contacts A and B. RESET switch 43 is also a dual-contact switch but has one normally open contact A and one normally closed contact B. START switch 41 is of the normally open single contact type. The connection of the above switch contacts will be described in due course as the description proceeds.

The comparator in addition employs eight relays having operating windings K1 through K8 inclusive. Each of the relays has a plurality of normally closed and normally open contacts operated by the relays. The nomenclature or numbering system described earlier will be used in the description of the contact connection which follows.

Windings K1 through K7 each have one end connected directly to ground while one end of winding K8 is connected to ground through normally closed contacts 43B of the push-button RESET switch 43. Each of the windings has its end remote from ground connected to voltage source 19 by one or more switching paths any one of which when closed energizes the relay it connects to source 19.

Winding K1 is connected to source 19 by four different paths. Each of the paths includes normally closed contacts K8–1. The first and second paths both include in addition contact 35A and wiper 35 which are directly connected to source 19. The first path also includes contacts 43A while the second includes normally open contacts K2–1. Paths three and four each include in addition to contacts K8–1, contacts 42B and normally open contacts K5–3. The third path also includes normally closed contacts K3–2 connected to source 19, while the fourth path includes normally closed contacts K4–1 connected to source 19. Winding K2 is connected to the common junction of contacts K8–1 and 43A and includes the four paths described above with the exception of contacts K8–1. It should be noted however that the path including contacts K2–1 is a latching path and cannot energize the winding. It can only hold the winding in the energized state once it is energized by appropriate contact closures in one of the other three paths.

Winding K3 is connected to source 19 by two different paths each of which includes normally closed contacts K7–1. Both include in addition contact 35A and armature 35, previously described. The first path also includes normally closed contacts K2–2 while the second includes normally open contacts K4–2. Winding K4 utilizes the same four paths as winding K1 described above with exception of contacts K8–1. In the case of winding K4 normally open contacts K8–2 are employed in place of normally closed contacts K8–1, previously described. Thus it is seen that windings K1 and K4 cannot be simultaneously energized.

Relay winding K5 may be initially energized by any one of two paths each of which include contacts 42B and 35A and armature 35, all previously described. The first in addition includes contacts 43A while the second includes contacts K2–1, all previously described. Two latching paths are also provided. Both have contacts K5–3 in common. The first has in addition contacts K4–1 while the second has contacts K3–2, all previously described.

Winding K6 can only be energized when fail cam 26 rotates, in either direction, a sufficient amount to cause detent 26D to displace follower 26F and thus close contact 33A. Since this may only be a momentary closure, latching contacts K6–1 are connected in parallel with contact 33A and armature 33. This parallel circuit is connected to source 19 by four paths all of which include previously described contacts. The first and second paths utilize contacts K4–1 and K3–2, respectively, while the third and fourth paths each include contacts K5–3, 42B, 35A and armature 35. In addition the third path includes contacts 43A while the fourth includes contacts K2–1.

Relay winding K7 has six energizing paths to source 19 and three latching paths. The six energizing paths include the three paths previously described available from the common junction of contacts 43A and K2–1 when coupled with the parallel paths provided by contacts 42A and contacts 41A of starting switch 41. The three latching paths are provided by normally open contacts K7–2 connected between winding K7 and the common junction of contacts 43A and K2–1.

Winding K8 is connected to ground through contacts 43B as previously described and to source 19 through contact 32B and armature 32 whenever cam follower 25F is in notch 25N of cam 25. In addition to the above path a diode 48 connected between the source side of winding K8 and the source side of winding K7 provides the same energizing paths to source 19 as were described above for relay winding K7. The function of diode 48 is to maintain winding K8 energized at the beginning of a test cycle until timer cam 30 moves sufficiently to permit follower 30F to come out of notch 30N. It is possible without diode 48 that follower 25F will come out of its notch before 30F and if this occurs winding K8 would be de-energized in the absence of diode 48, which event would terminate the test cycle before completion.

Lamps 37, 38 and 39 are selectively connected to source 19 for energization to indicate IN PROCESS, GO and NO GO circuit conditions. Lamp 37 is connected to contact 35B and is energized whenever cam follower 30F is out of notch 30N. Lamp 38 is connected to contact 35A by contact 34A, armature 34 and serially connected normally closed contacts K6–2 and K4–3. Thus, GO lamp 38 can only be illuminated at the termination of a test cycle when follower 30F is in notch 30N and when cam follower 27F is in notch 27N, provided windings K6 and K4 have not been energized. Lamp 39 is connected to source 19 by normally open contacts K6–3, contacts K4–3, armature 34, contacts K6–2, K4–3 and 35A. With this arrangement the lamp cannot be illuminated until the termination of a test cycle since follower 30F must be in notch 30N. In addition, follower 27F must be out of notch 27N or relay K6 must be energized. Since contacts K4–3 are common to all its energizing paths, winding K4 must be de-energized as well.

*Operation*

Before an automatic test cycle can be started cam follower 25F must be in notch 25N; when this is accomplished, cam follower 26F will be opposite detent 26D and cam follower 27F will be centered in notch 27N. Cam follower 30F will be in notch 30N and will remain therein while the cams 25, 26 and 27 are rotated to the positions indicated above. The cams as shown in the drawing are in the position they might assume after a test cycle which produced a GO signal. At the termination of a successful test as illustrated in the drawing the only relay winding energized is K3 which removes power from the motors 16 and 17 and until further action is manually initiated the circuit and the cams will remain as illustrated.

If another test cycle is desired, RESET push-button switch 43 must be manually actuated. This results in the momentary closing of contacts 43A and the momentary opening of contacts 43B. As soon as contacts 43A close, windings K1 and K2 are energized and winding K2 is latched through contacts K2–1. Winding K3 is simultaneously de-energized since contacts K2–2 open as soon as winding K2 is energized. When winding K3 is de-energized power is applied to the motors. With this arrangement the reference frequency is applied to frequency divider 15 and motor 17 which drives cam shaft 24 through differential 20. Cam shaft 29 will not move since contacts K1–4 connect the input to frequency divider 14 to ground. The reference signal is used to drive the unknown motor 17 so that timer cam 30 which is connected to motor 16 will not be advanced during the reset cycle. If it were permitted to advance the interval of the next test cycle would be shortened by the time necessary to accomplish reset of cams 25, 26 and 27.

The cams are driven until follower 25F falls into notch 25N. As soon as this happens winding K8 is energized through armature 32 and contact 32B. Winding K1 is de-energized when contacts K8–1 open and winding K4 is energized through contacts K8–2. As soon as winding K4 is energized winding K3 is energized through contacts K7–1, K4–2, 35A and armature 35 which results in the removal of operating power from motors 16 and 17. Thus the comparator will remain static as soon as winding K3 is energized with cams 25, 27 and 30 positioned so that their respective followers are centered in their respective notches and cam 26 is positioned so that the detent 26D is opposite or 180° removed from follower 26F. Windings K1, K5, K6 and K7 are de-energized and windings K2, K3, K4 and K8 are energized.

In this condition none of the lamps are illuminated which indicates that the comparator is reset and ready to start a test cycle. Either an automatic or self-test cycle may be started at this point by depressing switch 41 or 42. If self-test is desired, winding K5 is energized through contacts 42B and latched through contacts K5–3 and K4–1 or K3–2. This applies the reference voltage to frequency dividers 14 and 15 and simultaneously disconnects the unknown voltage from divider 15 by opening contacts K5–1. Otherwise the self-test cycle is identical to the automatic cycle which will be described. At the termination of a self-test cycle and during the subsequent reset cycle as described above, windings K3 and K4 become simultaneously energized thus releasing the latch on winding K5 which permits either an automatic or another self-test cycle to take place.

In order to initiate an automatic test the operator must depress switch 41 to close contacts 41A. As soon as this is accomplished, the cycle proceeds automatically since winding K7 is energized through contacts 41A, K2–1, 35A and armature 35 and latched through contacts K7–2 which parallel momentary closure contacts 41A. Winding K3 is de-energized as soon as contacts K7–1 open which connects motors 16 and 17 to source 19. As soon as the motors are connected to source 19, motors 16 and 17 are driven by the reference and unknown frequency, respectively. After shaft 29 drives a small angle, follower 30F comes out of notch 30N and armature 35 is moved to contact 35B. This applies power to the IN PROCESS lamp 37 which becomes illuminated to indicate that a test is in process. When armature 35 moves to contact 35B, windings K1 through K4, inclusive, and K7 are de-energized for at least the remainder of the test cycle which lasts for about three minutes, the time required for cam 30 to make one complete revolution.

The test cycle terminates when follower 30F drops into notch 30N at which time armature 35 engages contact 35A. This removes power from lamp 37 and connects lamp 38 to source 19 if the test is successful or lamp 39 if the test is unsuccessful. At the completion of a successful test, follower 27F is in notch 27N, and armature 34 remains in engagement with contact 34A. In addition detent 26D never moves enough in either direction to cause winding K6 to become energized; therefore, lamp 38 is energized through contact 34A; armature 34; contacts K6–2, K4–3, 35A and armature 35.

With an unsuccessful test, follower 27F leaves notch 27N and lamp 39 is energized through either contacts K6–3 or contacts K6–2 and contact 34B and armature 34. If the error is large enough to drive cam 27 so that follower 27F leaves notch 27N and then returns, detent 26D will cause winding K6 to be energized and latched and the energization path for lamp 39 will be through contacts K6–3.

With the completion of a test cycle, reset, as previously described, is necessary before another test cycle may start. This is true even after a self-test cycle in which none of the cams move since forced reset is employed.

The forced reset is necesary to insure that the cam followers, especially follower 25F, enter their respective notches from the same direction at all times. If this is done the possible error is substantially reduced. Forced reset is initiated by contacts 43B since these contacts open and de-energize winding K8 which simulates, as far as the comparator is concerned, the condition present when follower 25F is out of notch 25N. Thus a reset must proceed until winding K8 is again energized when the follower 25F enters notch 25N.

While only one embodiment of the invention has been shown and described in detail for illustration purposes, applicants wish it clearly understood that the invention is not limited to the specific details disclosed.

What is claimed is:

1. A frequency comparison circuit for providing indications when two frequencies compared fall within a predetermined percentage of each other comprising,
   a first frequency dividing means responsive to a reference frequency for dividing the frequency by a predetermined amount,
   a second frequency dividing means responsive to an unknown frequency for dividing the unknown frequency by the same predetermined amount,
   first movable means responsive to the first frequency dividing means producing a mechanical movement corresponding in amplitude to the frequency supplied by said first frequency dividing means,
   second movable means responsive to the second frequency dividing means producing a mechanical movement corresponding in amplitude to the frequency supplied by said second frequency dividing means,
   means responsive to the mechanical movement of said first and second movable means producing a bidirectional mechanical difference movement having an amplitude and direction corresponding to the amplitude and sign, respectively, of the difference between the mechanical movements of said first and second movable means,
   a first displaceable element responsive to said difference movement,
   first bistable means coupled thereto whereby said first bistable means resides in its first stable state when the first displaceable element occupies a predetermined position and its second stable state when said first displaceable element is located in any other position,
   a second displaceable element responsive to said difference movement,
   second bistable means coupled thereto including actuating means whereby said second bistable means resides in its first stable state when said actuating means is located between two predetermined fixed points located on said second displaceable element and is in its second stable state at all other times,
   a third displaceable element responsive to said difference movement,
   third bistable means coupled thereto whereby said third bistable means resides in its first stable state as long as a predetermined point on said third displaceable element does not attain a selected position with respect to said third bistable means and shifts to and remains in its second stable state whenever said selected position is attained, and
   means responsive to said first, second and third bistable means for providing a first indication during a comparison when said first bistable means resides in its second stable state, a second indication at the end of a comparison provided said second and third bistable means are both in their first bistable states, and a third indication at the end of a comparison whenever either of said second and third bistable means occupies its second stable state.

2. A frequency comparison circuit as set forth in claim 1 in which the first, second and third displaceable elements each include a unique cam surface which undergoes movement in response to the difference movement, and each of said first, second and third bistable means includes a cam follower urged into engagement with its respective cam surface and a two-channel switching means operated in response to its associated cam follower.

3. A frequency comparison circuit as set forth in claim 1 in which the means responsive to the mechanical movements from said first and second movable means is a mechanical differential having a first and second input connected to the first and second movable means, respectively, and an output which produces a mechanical movement equal in amplitude to the difference of the amplitude of the movements of the two inputs.

4. A frequency comparison circuit as set forth in claim 3 in which the first, second and third displaceable elements each include a unique cam surface which undergoes movement in response to the difference movement, and each of said first, second and third bistable means includes a cam follower urged into engagement with its respective cam surface and a two-channel switching means operated in response to its associated cam follower.

5. A frequency comparison circuit for providing indications when two frequencies which are being compared fall within predetermined percentages of each other comprising,
   a first frequency dividing means responsive to a reference frequency for dividing the frequency by a predetermined amount,
   a second frequency dividing means responsive to an unknown frequency for dividing the unknown frequency by the same predetermined amount,
   first movable means responsive to the first frequency dividing means producing a mechanical movement corresponding in amplitude to the frequency supplied by the said first frequency dividing means,
   second movable means responsive to the second frequency dividing means producing a mechanical movement corresponding in amplitude to the frequency supplied by the said second frequency dividing means,
   means responsive to the mechanical movements from said first and second movable means producing a bidirectional mechanical difference movement having an amplitude and direction corresponding to the amplitude and sign, respectively, of the difference between the mechanical movements of the said first and second movable means,
   means responsive to the amplitude and direction of the last said means for providing a first or second indication when the said difference movement, in any one given direction, is above or below a predetermined percentage of the total mechanical movement of the said first movable means,
   and means responsive to the total movement of said first movable means for controlling, as a function of said total movement, said means for providing the first and second indication to terminate the comparison at the end of a predetermined interval.

6. A frequency comparison circuit as set forth in claim 5 in which the means responsive to the mechanical movements from said first and second movable means is a mechanical differential having a first and second input connected to the first and second movable means, respectively, and an output which provides a mechanical movement equal in amplitude to the difference of the amplitude of the movements of the two inputs.

(References on following page)

References Cited by the Examiner

UNITED STATES PATENTS

| | | | |
|---|---|---|---|
| 2,176,742 | 10/39 | La Pierre | 324—79 |
| 2,334,863 | 11/43 | Canetta et al. | 324—79 |
| 2,424,833 | 7/47 | Korman | 324—79 |
| 2,503,105 | 4/50 | Freas | 324—85 |

FOREIGN PATENTS 706,298  3/54  Great Britain.

WALTER L. CARLSON, *Primary Examiner.*